Aug. 8, 1967  R. A. SCOTT ETAL  3,334,864
TIRE SERVICING APPARATUS
Filed Jan. 10, 1966  3 Sheets-Sheet 1

Inventors:
Ray A. Scott
Elmer J. Strang
By: Hofgren, Wegner, Allen,
Stellman & McCord
Attorneys

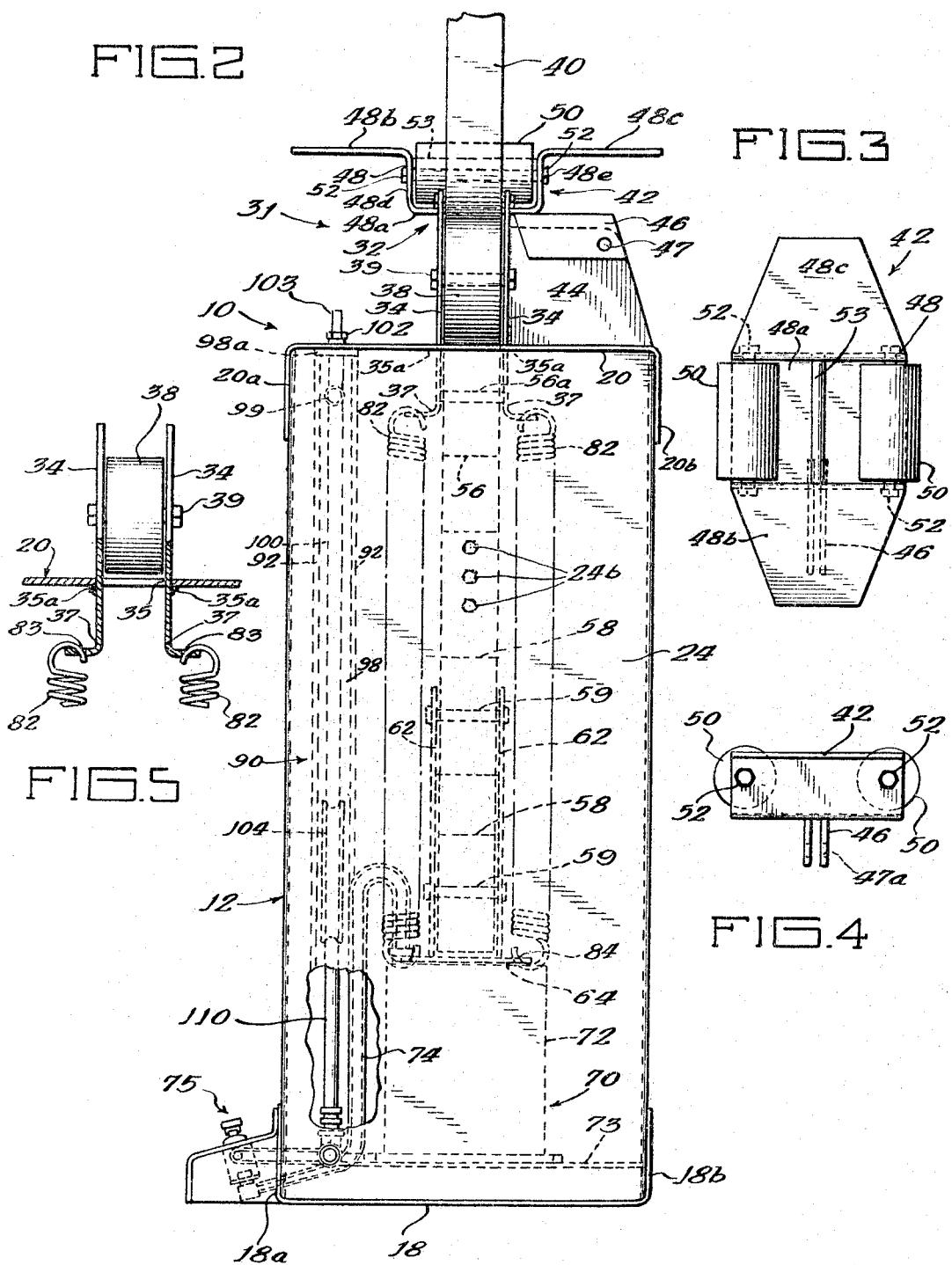

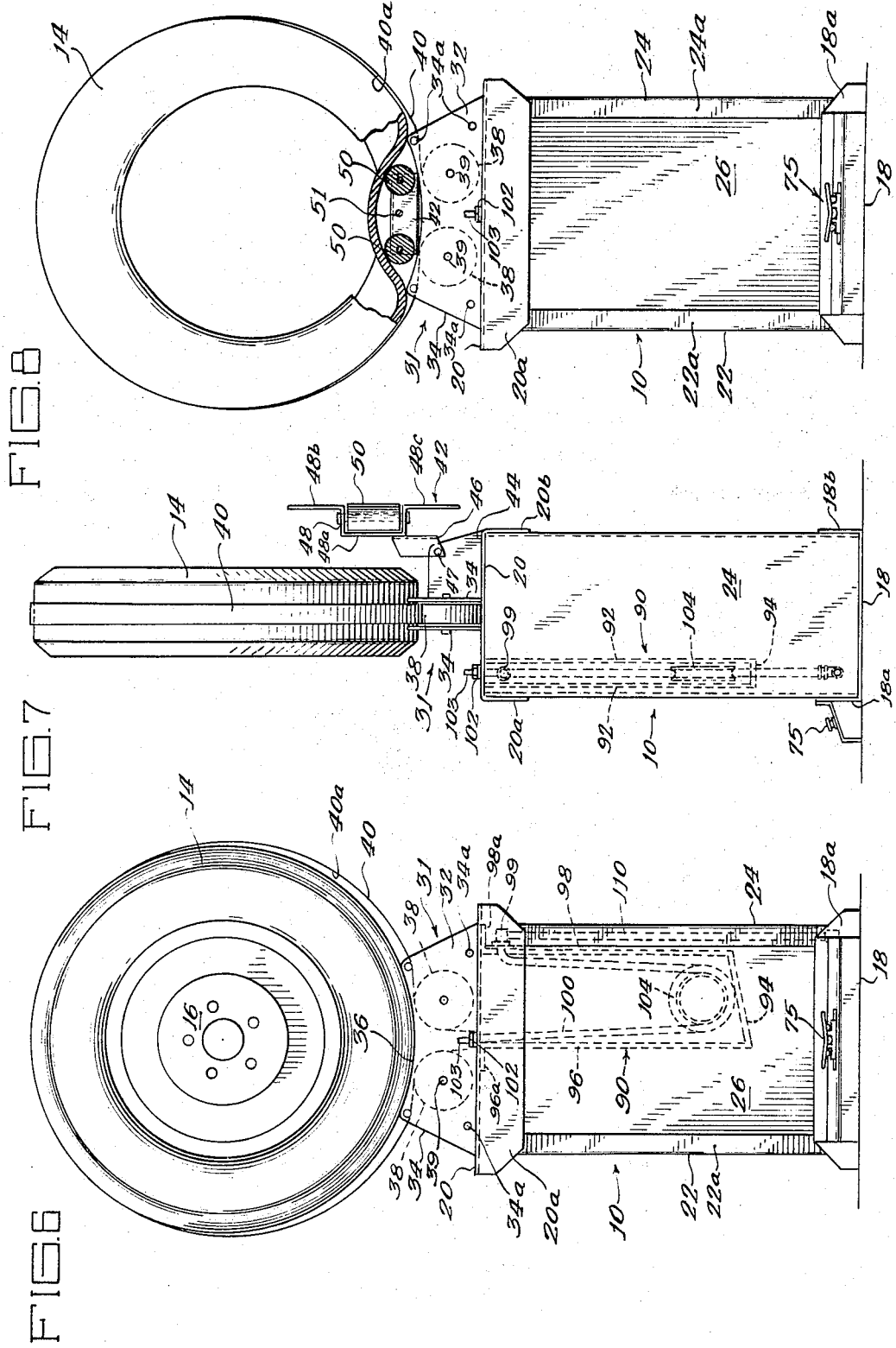

United States Patent Office 3,334,864
Patented Aug. 8, 1967

3,334,864
TIRE SERVICING APPARATUS
Ray A. Scott and Elmer J. Strang, Fort Dodge, Iowa, assignors to The Coats Company, Inc., a corporation of Iowa
Filed Jan. 10, 1966, Ser. No. 519,569
7 Claims. (Cl. 254—50.3)

ABSTRACT OF THE DISCLOSURE

A tire servicing stand wherein a band projects exteriorly from the supporting surface of the stand for embracing a tire about its tread, the band being reeved about pulleys on a movable pulley block in the interior of the stand and further reeved about pulleys affixed to the stand, with the terminal ends of the band affixed to the stand itself so that movement of the pulley block in the interior of the stand changes the exterior size of the band whereby to expose the interior surface of a tire body for inspection or to expand tire beads toward seating position on a wheel rim, alternatively. A manually controlled piston and cylinder device and return spring afford to and fro movement of the pulley block.

---

This invention relates to vehicle tire service apparatuses and more particularly to a novel and improved device for inspecting tire casings and for seating vehicle tires on a rim.

The repair of a tire puncture has been a common problem since the introduction of the pneumatic tire. Formerly, when inner tubes were used to contain the air under pressure within the tire casing, the puncture was generally located by partially inflating the tube and moistening the surface of the inner tube in an attempt to determine the location of the puncture by discovering bubbles which would form on the surface of the inner tube in the area of the puncture. With the advent of tubeless tires, the inspection and location of a puncture in the tire casing became much more difficult. Since the tire casing is a relatively rigid structure, it cannot be easily bent and manipulated in an effort to locate the puncture.

This invention is directed to the provision of a mechanism for spreading and distorting a vehicle tire casing so as to permit full and easy inspection of the casing to determine the location of casing defects, such as punctures and the like. To this end, the mechanism is provided with a band forming an expandable and contractable loop which is to be wrapped around the tire tread. A spreader assembly is positioned interiorly of the loop at one point so that as the loop is collapsed and clamped about the periphery of the tire, the tire casing will be distorted in the area of the spreader assembly to permit inspection of the casing. In addition, inflation apparatus may be provided so that a tire mounted on a wheel rim may be clamped within the expansible band and the tire seated on the rim by inflation. The apparatus is easily operable requiring only two hands to mount the tire and operate the apparatus.

It is therefore a primary object of this invention to provide a new and improved tire inspecting apparatus.

It is another object of this invention to provide a novel tire spreading apparatus which may also be utilized to seat a tire casing on a vehicle rim.

It is yet another object of this invention to provide a new and improved tire casing inspecting apparatus which may be easily operated by only one man.

Yet another object of this invention is to provide a new and improved tire spreading apparatus for inspecting tire casings wherein the full interior of the tire casing may be distorted for sufficiently inspecting the tire casing for defects.

A further object of this invention is to provide a novel tire servicing apparatus having a first surface thereon for supporting a tire casing in a nondistorting fashion and a second surface, movable between an inoperative position to an operative position overlying the first surface, for supporting a tire casing in a distortable fashion, and a peripheral tire clamping band for holding a tire casing on said first and second surfaces.

Still another object of this invention is to provide a novel tire servicing apparatus having an upper surface for supporting a tire and a peripheral clamping band extending in the loop above the surface for holding the tire thereon and a piston and cylinder device connected to the ends of the band for expanding and contracting the loop as the piston rod moves relative to the cylinder, the resistant force of the tire casing being clamped by the band serving as a stop means when this force generally equals the force of the fluid acting on the piston.

Still another object of this invention is to provide, in a tire servicing apparatus as described, an inflation hose assembly consisting of a generally thin, elongate, closed housing which houses the inflation hose and a weight member within the housing of the assembly having dimensions generally coextensive with the thickness and width of the assembly but substantially less than the longitudinal extent of the assembly, the hose being wrapped about the member so that as the hose is pulled outwardly of the housing, the member will be moved longitudinally of the housing and as the hose is released, the member will cause the retraction of the hose within the housing.

Another object of this invention is to provide a novel tire servicing apparatus as described wherein the peripheral clamping band and tire supporting surface cooperate to squeeze a tubeless tire about its tread thereby forcing the tire beads to expand outwardly toward the seating surface of a vehicle rim. Under such expanded conditions, air admitted to the casing is retained inside the casing and with a sufficient increase in pressure the beads on the casing will properly seat on the vehicle rim. Of course, the band must be relaxed as soon as the beads are seated so that the normal inflation of the tire may be completed.

Other objects, features and advantages of the present invention will be apparent from the following description of the preferred embodiments illustrated in the accompanying drawings, in which:

FIGURE 2 is a fragmentary side elevational view of the tire spreader shown in FIGURE 1;

FIGURE 3 is a top plan view of the spreader assembly used with the device of this invention;

FIGURE 4 is a side elevational view of the spreader assembly shown in FIGURE 3;

FIGURE 5 is a fragmentary view, partially in section, of a portion of the structure shown in FIGURE 1;

FIGURE 6 is a front elevational view of the tire spreader of this invention showing a casing mounted on a vehicle rim and supported on the wheel supporting structure with the tire retaining band loosely associated about the periphery of the tire;

Figure 1:
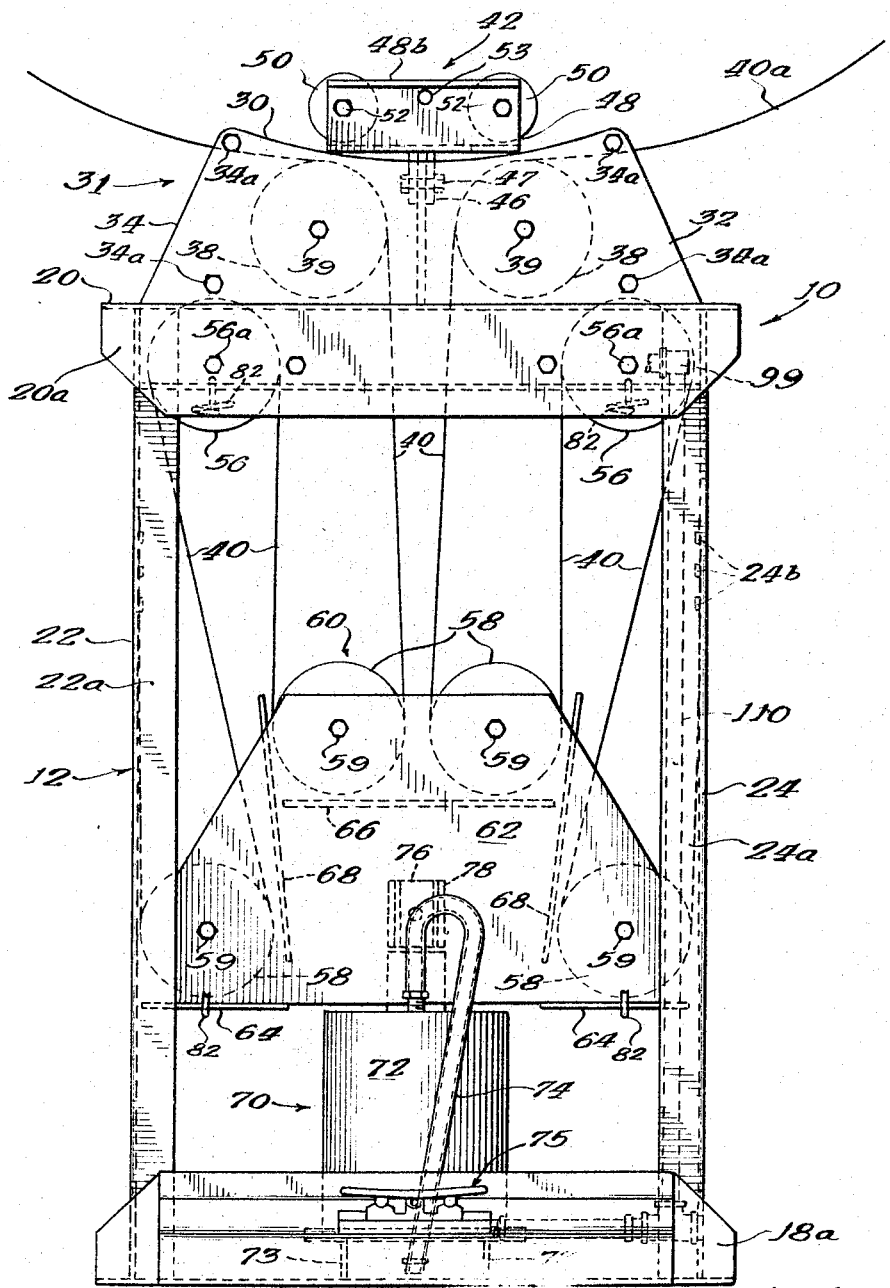
FIGURE 1 is a fragmentary front elevational view of the tire spreading apparatus of this invention with the front panel removed for clarity in illustrating the interior structure, showing the apparatus in a retracted position.

FIGURE 7 is a side elevational view of the components shown in FIGURE 6, also illustrating the spreader assembly pivoted to one side; and FIGURE 8 is a front elevational view of the tire spreader of this invention with a tire casing mounted thereon and tightly clamped by the band, showing the spreader assembly in place and distorting the tire casing to permit easy inspection of the casing for defects such as punctures or the like.

Referring now to the drawings, the tire spreader 10 of this invention includes a frame generally indicated 12 for supporting a tire casing 14 which may or may not be mounted on a vehicle rim 16 as shown in FIGURES 6 through 8. The tire may be supported for inflating the tire to assist in seating the tire on a vehicle rim or for spreading and distorting the tire to inspect the casing for defects such as breaks or punctures therein.

The frame includes a first bottom panel 18 having upturned side walls 18a and 18b and a second spaced top panel 20 having downturned side walls 20a and 20b. Preferably the panels 18 and 20 are substantially identical so that they may be formed as single stampings with minor changes made in drills or cuts made therein to accommodate different component structures.

The frame further includes a pair of upright spaced end walls 22 and 24, each of which have inturned side portions such as 22a and 24a, respectively. Preferably these end walls are also formed substantially identical to each other. The end walls serve to support the top panel 20 spaced from bottom panel 18. Side panels 26 may be provided for enclosing the opposite sides of the structure to mask the interior components from view and give a neat, trim appearance. It is understood that the side panels will be provided with a well-known connecting structure making them easily removable for ready access to the interior. Preferably the panels 18 and 20 and walls 22 and 24 are made of heavy steel to sufficiently support the other components of the mechanism as well as a vehicle rim and tire casing which may be held on the mechanism, and to withstand the relatively heavy abuse which may be prevalent in a tire repair shop, service station, or the like.

The tire spreader 10 of this invention is provided with a means 31 for supporting either a vehicle rim and tire casing for seating the casing on the rim by inflation or for supporting a tire casing removed from a rim for inspecting the casing for defects. Included in this means 31 is a first wheel support means 32 for supporting the tire casing and vehicle rim in a generally nondistorting manner to facilitate inflation of the casing to seat the casing on the rim. Means 32 includes a pair of upright plates 34, preferably made of heavy steel similar to the panels 18 and 20 and end walls 22 and 24. These plates extend through an opening 35 in the top panel and are secured to the panel by being welded along the underside panel at 35a as shown in FIGURE 5. The upper or free portion of each of the plates 35 has an arcuate configuration 36 which generally mates with a tire periphery. The lower portion of each of the plates is bent outwardly in an L-shape. The plates are held spaced apart by such means as bolts 34a.

A pair of pulleys or rollers 38 are rotatably mounted between the plates on bolts 39. These rollers receive and support portions of the tire clamping or holding means or band 40 which is formed as a loop 40a on the exterior of the frame. Preferably tire holding means 40 is a thin, elongate steel band approximately .028 inch thick by 2 inches wide made of spring steel or similar material. In the preferred embodiment, the band is approximately 200 inches long to accommodate vehicle tires of a size for mounting on rims between 10 inches to 17.5 inches. In operation, the band moves between a relaxed or released position as shown in FIGURE 6, wherein it will loosely embrace the periphery or tread of a tire casing which is mounted on the tire supporting means 31, to a clamping or tight position as shown in FIGURE 8 which will either hold a tire and rim on the support 32 or hold and distort a tire casing on the tire spreader assembly or distorting means 42 as shown in FIGURE 8.

Tire spreader assembly 42 is mounted upon an upright plate 44 secured to the top panel 20 generally perpendicularly to the wheel support assembly 32. A pair of spaced plate arms 46 provide part of a hinge pivoting the spreader assembly by bolt 47 to plate 44. The bolt extends through openings 47a in arms 46 and in opening (not shown) in plate 44, to support the spreader assembly 42 so that it may be swung between a first operative position as shown most clearly in FIGURE 2 wherein it overlies the plates 34 of wheel support 32 and a second inoperative position best shown in FIGURE 7 wherein it is swung out of the position shown in FIGURE 2 so that a tire may be supported directly on the wheel support 32.

Plate 48 has a generally centrally oriented trough portion 48a and two outwardly extending supporting surfaces 48b and 48c with wall portions 48d and 48e interconnecting portions 48b and 48c with trough 48a, respectively. A pair of rollers 50 are rotatably mounted in the trough portion 48a by pin means 52 to provide a roller surface for distorting the tire casing when the plate 48 is swung to the position in FIGURES 2 and 8. The rollers are so mounted in the trough that when the plate is swung to its operative position overlying the arcuate edges 36 of plates 34, the axis of the rollers will extend in a line generally parallel to the center line of the loop 40a. A pin 53 may be mounted generally equidistantly between the rollers 50 extending between walls 48d and 48e to prevent a tire casing from bulging downwardly between the rollers.

The free ends of the steel band 40 are looped above the frame as best shown in FIGURES 6 through 8 and extend inwardly of the frame, connected with the frame and reeved over pulleys for reducing or enlarging the size of the loop above the frame to secure or release a tire relative to the frame. To this end, the ends of the band are wrapped about pulleys in the interior of the frame including pulleys 56 which are fixed in the frame for rotation and rotatable pulleys 58 which are movable relative to the frame. As the pulleys 58 move relative to the frame, the length of the band in the interior of the frame changes. Thus when pulleys 58 move downwardly, the length of the band increases in the interior of the frame, making the loop 40a smaller. Conversely, when the pulleys 58 move upwardly in the frame, the length of the band increases exteriorly of the frame enlarging the loop 40a.

Four pulleys 58 are rotatably mounted on shafts 59 in a generally trapezoidal-shaped movable block means 60 to provide a means for moving the movable pulleys 58. Block means 60 includes a pair of spaced heavy plates 62 which are joined at the bottom by spaced bottom plates 64. The upper pulleys 58 are closely spaced from each other and generally within the lateral spacing between the widely separated lower pulley 58. An upper horizontal cross-plate 66 is provided just below the periphery of the upper pulleys 58 and a pair of vertical cross-plates 68 extend generally tangential to the outer lower pulleys and inner upper pulleys. The close proximity of plates 66 and 68 to the peripheral portions of pulleys 58 prevents the bands 40 from becoming disassociated from the surfaces of the pulleys.

The reeving of the opposite ends of the steel band about the fixed and movable pulleys is similar for each end of the band as can be seen in FIGURE 1. Each end of the band passes into the tire supporting base over a fixed pulley 38 and then is reeved alternately over a pulley in the movable carriage 60, to another fixed pulley 56 on the supporting base, back to a different pulley 58 in the movable carriage and then to its solid connection with the frame on either of the side members 22 or 24. The respective ends of the band are bolted to the side members, for example, by bolts 24b in FIGURE 2. The movable carriage or member 60 attached to the end of the piston rod moves all of the pulleys 58 away from the support for the tire casing and in so doing, through the multiplication of the block and tackle arrangement created by the bands and pulleys, the loop about the supporting base is caused to decrease its size. When air pressure is released from the cylinder, the springs 82 raise the carriage toward the supporting base and the steel band will increase its size and exit over the uppermost pulleys 38 automatically.

Means 70 are provided for moving member 60 relative to the frame and therefore changing the size of the loop 40a. This means includes a piston and cylinder device 72, preferably one that is pneumatically actuated. Cylinder 72 is held on a pair of beams 73 which are secured to the bottom panel 18. A fluid line 74 leads from a fitting with the cylinder to a foot valve 75 so that depression of the valve may admit air or suitable fluid through line 74 to the interior of cylinder 72 to actuate the same. The piston rod 76 is attached to plate 78 connected to member 60 so that as the rod moves, the member 60 will move accordingly.

Means are also provided for normally urging the member 60 toward the top or wheel supporting end of the frame and therefore normally urge the loop 40a to a relaxed or expanded position. The preferred embodiment of this means takes the form of springs 82 hooked at one end 83 to portion 37 of plates 34 and hooked at the other end 84 to portions of the bottom plates 64 which project laterally beyond the plates 62 of member 60.

In operation, in order to inspect a tire casing for defects therein, plate 48 is swung to the operative position shown in FIGURES 1, 2 and 8 overlying the arcuate surfaces 36 of plates 35. The tire casing is then placed within the loop 40a of band 40 on plate 48, resting generally on rollers 50. Next the foot valve is depressed to admit air to the cylinder 72, causing the piston therein to move downwardly and, therefore, to pull the block member 60 downwardly in the frame. This shortens the length of the band on the exterior of the frame, tightening the loop 40a and clamping the tire so that the casing becomes distorted against the spreader means 42 as shown in FIGURE 8. Release of the foot valve permits the springs to return the member 60 so that the loop increases in size. Therefore, by alternately releasing and depressing the foot valve and rotating the tire on the stand, the entire extent of the tire may be inspected. For this purpose, the rollers 50 assist in rotating the tire. Thus, in typical use, the tire casing will be inserted within the band, the foot valve depressed, a portion inspected, the foot valve released, the tire rotated slightly, the foot valve depressed again to inspect another portion, and so on.

No structural stop means is necessary for limiting the downward descent of block 60 in that it will only be pulled down as far as a point wherein the inherent strength of the tire casing will equal the force imposed by the air pressure on the piston and of the cylinder 72. It is to be understood that FIGURES 1 and 2 show the members 60 in a position of maximum depression wherein the band would have its smallest loop. However, if the tire 14 were of a large size, it is possible that member 60 would be pulled only to a point intermediate the extreme limits of its travel, and at this point, the loop 40a would be small enough to squeeze and deform the tire substantially as shown in FIGURE 8.

The full extent of the side walls of the tire casing, as well as the tread, may be inspected if the tire is mounted so that it is slightly canted relative to the loop 40. In this manner, the side walls of the casing will be spread out and distorted on the surfaces of plate 48. Once the lolocation of the repairable defect has been ascertained, the defect may be repaired on the stand. The operator need merely hold the tire in the deformed condition through the use of the foot actuated valve and make the repairs with the casing spread and deformed, obviously easier than repairing the casing in a normal condition.

For inflating a tire and seating a tire on a wheel rim, the mechanism of this invention is provided with an inflation assembly 90. This includes a housing comprising a pair of spaced, flat, generally trapezoidal-shaped plates 92 each having an inclined bottom 92a. A bar-like member 94 joins the bottoms of plates 92, and side walls 96 and 98 serve to enclose the structure. The upper end of the side walls are provided with outwardly extending ears 96a and 98a to provide a means for securing the housing to the underside of top panel 20. The shorter side wall 98 has an air hose fitting 99 at the upper end. An air hose 100 of a length substantially equal to the interior periphery of the housing extends from this fitting through an opening (not shown) in the top panel 20.

An enlarged portion or bulbous attachment 102 is affixed to the portion of the hose projecting to the exterior of the housing. It is intended that attachment 102 will be larger than the opening through which the hose extends to continually hold a small portion of the hose in a position for use. The extreme free end of the hose 103 is provided with a conventional valving structure for tire inflation hoses, actuable responsive to engagement with a tire stem to permit a flow of air under pressure into the interior of a tire casing.

The interior of the housing of the inflation assembly 90 is provided with a flanged pulley 104 which has a thickness generally coextensive with the spaced plates 92 and a diameter generally coextensive with the distance between the side walls 96 and 98. Hose 100 is wrapped about the pulley to provide a means for the automatic return of the hose. When the hose is pulled outwardly of the housing, the pulley moves upwardly. As soon as the hose is released, the pulley moves downwardly in the housing to a point shown in FIGURE 6, retracting the hose within the housing.

In operation, for inflating a tire casing and seating the same on a rim, the plate 48 is swung out of the way as shown in FIGURE 7 and a tire and wheel rim are inserted between the loop 40a as in FIGURE 6. The foot valve 75 is then depressed and the loop 40a clamps the tire to hold the tire and rim on the wheel support 32. Hose 100 may then be extended from the housing and air applied to the tire valve, preferably in short bursts to insure proper seating. As soon as the tire is partially inflated, the pressure on the band 40 should be released and inflation continued until a suitable pressure is reached.

The tire servicing apparatus of this invention is particularly suited for seating tire beads on vehicle rims. When a tire and rim are mounted as shown in FIGURES 6 and 7, subsequent actuation of the piston and cylinder device 72, causing the band to contract about the periphery of the tire, will force tire beads to expand outwardly toward the bead seating surfaces of the vehicle rim. One problem prevalent in seating tubeless tires on vehicle rims is that when the tire is assembled on the rim, the tire beads are generally in the area of the drop center of the rim so that as air is admitted to the rim it may easily escape through the space between the beads and that portion of the rim. However, when the tire beads are located adjacent the bead seating surfaces of the rim (as will occur when loop 40a is contracted about the periphery of tire 14), the air applied to the rim and tire will be retained inside the tire casing. As the pressure increases, the beads of the tire casing will properly seat on the bead seating surface of the tire rim. During inflation the loop 40a may be intermittently expanded to permit inflation of the tire to the proper pressure.

The tire servicing apparatus disclosed herein provides a means for easily inspecting a tire casing for defects both in the tread and side wall areas as well as providing a means for seating a tire on a vehicle rim. The apparatus is easy to operate in that the operator needs only two hands to position the tire within the loop of the band and may control expansion and contraction of the band to clamp and release the tire through the use of a foot valve which actuates the piston and cylinder device. Moreover, with the use of the piston and cylinder device as a power source for moving the means which changes the size of the loop, the need for a separate limit means is eliminated in that the stroke of the piston will be limited by the counteracting forces in the tire casing resisting further compression by the contracted loop.

The foregoing detailed description has been given for clearness of understanding only, and no unnecessary limitations should be understood therefrom, as some modifications may be obvious to those skilled in the art.

We claim:

1. An automotive tire handling device, comprising: a tire supporting base upon which a portion of the tread of a tire may be placed for supporting the tire; a frame attached to the supporting base; a pulley block movably mounted in said frame; band means having opposite ends secured in said frame; a portion reeved about said pulley block with an intermediate portion extending about and past said supporting base in a loop beyond said base; and means in said frame for moving said pulley block so as to withdraw a portion of the band means into the frame and decrease the size of the loop whereby a tire may be engaged and squeezed about its tread against said supporting base upon actuation of said pulley block moving means.

2. An automotive tire handling device, comprising: a tire supporting base upon which a portion of the tread of a tire may be placed for supporting the tire; a frame attached to the supporting base; band means having opposite ends secured in said frame with an intermediate portion extending about and past said supporting base in a loop beyond said base; power means in said frame; driving means connecting said power means and band means so as to withdraw a portion of the band means into the frame and decrease the size of the loop whereby a tire may be engaged and squeezed about its tread against said supporting base; and tire spreader means swingably mounted upon said supporting base for movement between a first inoperative position off the base and beside a tire casing supported on the base, and a second position across the base, inside the band loop, for bulging a tire casing inside out when the band means is tightened about the tire to thrust the tire against the base.

3. The device of claim 2 wherein said spreading means includes roller means constructed and arranged to engage the tire periphery and distort the same when said band is compressed to clamp and distort a tire casing.

4. An automotive tire handling device, comprising: a tire supporting base upon which a portion of the tread of a tire may be placed for supporting the tire; a frame attached to the supporting base; band means having opposite ends secured in said frame with an intermediate portion extending about and past said supporting base in a loop beyond said base; a piston and cylinder device mounted in the frame; and a pulley block means movable with, and upon actuation of, the piston and cylinder device, said band means being reeved about said pulley block means for changing the size of the loop to the exterior of said base whereby a tire may be engaged and squeezed about its tread against said supporting base.

5. The tire handling device of claim 4 wherein opposite ends of the band means are secured to the frame and fixed pulleys are secured in the frame and movable pulleys are secured in the pulley block means with said band means being reeved alternately over said fixed and movable pulleys whereby actuation and release of said piston and cylinder device will contract and extend said loop of the band means relative to the supporting base.

6. The device of claim 4 wherein the piston and cylinder device is opposed in its actuation by springs connecting the pulley block means and the supporting base and said piston and cylinder device is power actuated in a direction away from the supporting base and returned toward the base by said springs.

7. A tire handling device, comprising: a frame, including a base and an outer platform supported in spaced relation relative to said base; wheel accommodating means including wheel support means comprising a support member projecting outwardly of the outer platform and having an outwardly facing arcuate surface generally mating with a segment of a tire periphery; tire support and deforming means comprising an element connected to the outer platform for movement between a first operative position across the arcuate surface of the support member and a second inoperative position spaced away therefrom, said element having roller means arranged so that the axis of the rollers lies across the arcuate edge of the support member when the element is in the first operative position and the roller axis is generally parallel to the axis of a tire held thereon; a tire clamping band projecting exteriorly of the tire platform and forming a loop generally constituting a continuation of the arcuate surface of the support member with the ends of the band extending inwardly in the frame; pulley means about which the band is wrapped including a plurality of first pulleys fixed to the frame and a plurality of second pulleys mounted on a member movable with respect to the frame, the ends of said band being reeved over said pulleys so that movement of the movable member relative to the frame changes the length of the band positioned exteriorly of the frame to change the size of the loop from a first relaxed tire receiving configuration to a second contracted tire clamping configuration; means for normally urging the movable member to a loop expanded position; and means for moving the movable member away from the loop expanded position to contract the loop and clamp the periphery of a tire inserted therein including a piston and cylinder device connected to the movable member so that movement of the piston rod moves the movable member accordingly; and valve means for controlling actuation of said piston and cylinder device, whereby when the tire support and deforming means is in the second position, a tire and rim may be inserted within the loop and held therein by contraction of the loop responsive to actuation of the valve means for servicing the rim and wheel and when said tire support and deforming means is moved to the first position, the tire casing may be inserted within the loop and will be clamped and deformed responsive to actuation of the piston and cylinder device by the foot valve to contract the loop and deform that portion of the tire casing which overlies the tire support and deforming means.

References Cited

UNITED STATES PATENTS

| 1,685,038 | 9/1928 | Teich | 254—50.4 |
| 2,173,795 | 9/1939 | Fisher | 254—50.4 X |
| 2,257,368 | 9/1941 | Cochin | 137—355.25 X |
| 2,778,415 | 1/1957 | Murray | 157—1.21 |
| 2,818,913 | 1/1958 | Twiford | 157—1.21 |
| 2,968,343 | 1/1961 | McConkie | 157—1.21 |
| 3,044,748 | 7/1962 | Branick | 254—50.3 |

FOREIGN PATENTS

| 1,144,328 | 4/1957 | France. |

WILLIAM FELDMAN, *Primary Examiner.*

MILTON S. MEHR, *Examiner.*